US008769417B1

(12) United States Patent
Robinson et al.

(10) Patent No.: US 8,769,417 B1
(45) Date of Patent: Jul. 1, 2014

(54) IDENTIFYING AN ANSWER TO A QUESTION IN AN ELECTRONIC FORUM

(75) Inventors: James G. Robinson, Olympia, WA (US); Joseph King, Seattle, WA (US); Brandon W. Farrell, Seattle, WA (US); Russell A. Dicker, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 270 days.

(21) Appl. No.: 12/873,000

(22) Filed: Aug. 31, 2010

(51) Int. Cl.
*G06F 17/30* (2006.01)
*G06F 3/048* (2013.01)

(52) U.S. Cl.
USPC ........... 715/751; 715/764; 715/780; 715/708; 715/714

(58) Field of Classification Search
CPC ................................. G06F 17/30; G06F 3/048
USPC .......................... 715/780, 764, 751, 708, 714
See application file for complete search history.

(56) References Cited

U.S. PATENT DOCUMENTS

| 6,904,263 | B2 | 6/2005 | Grudnitski et al. |
| 7,305,436 | B2 | 12/2007 | Willis |
| 7,418,437 | B1 | 8/2008 | Marks |
| 7,424,516 | B2 | 9/2008 | Leeds |
| 7,596,578 | B1 | 9/2009 | Marks |
| 7,801,845 | B1 | 9/2010 | King et al. |
| 8,019,753 | B2 | 9/2011 | Podgorny et al. |
| 8,392,360 | B1 | 3/2013 | Dicker et al. |
| 2001/0049616 | A1 | 12/2001 | Khuzadi et al. |
| 2002/0059088 | A1 | 5/2002 | Whalen et al. |
| 2002/0138588 | A1 | 9/2002 | Leeds |
| 2003/0227479 | A1 | 12/2003 | Mizrahi et al. |
| 2004/0008423 | A1 | 1/2004 | Driscoll, Jr. et al. |
| 2004/0236580 | A1 | 11/2004 | Bennett |
| 2004/0255232 | A1 | 12/2004 | Hammond et al. |
| 2005/0054286 | A1 | 3/2005 | Kanjilal et al. |
| 2005/0095569 | A1 | 5/2005 | Franklin |
| 2005/0125504 | A1 | 6/2005 | Leeds |
| 2006/0004601 | A1* | 1/2006 | Marks ............................. 705/1 |
| 2006/0125504 | A1 | 6/2006 | Tan et al. |
| 2006/0200353 | A1 | 9/2006 | Bennett |
| 2007/0156653 | A1 | 7/2007 | Garg |
| 2007/0219958 | A1* | 9/2007 | Park et al. ......................... 707/3 |
| 2007/0255702 | A1 | 11/2007 | Orme |
| 2007/0269788 | A1 | 11/2007 | Flowers et al. |
| 2008/0108881 | A1 | 5/2008 | Stupp et al. |

(Continued)

OTHER PUBLICATIONS

U.S. Appl. No. 11/963,755, filed Dec. 21, 2007 by King et al.

(Continued)

*Primary Examiner* — Andrea Leggett
(74) *Attorney, Agent, or Firm* — Knobbe, Martens, Olson & Bear, LLP (57) ABSTRACT

Systems and methods are provided for identifying an answer to a question in an electronic discussion forum. In some embodiments, text from a discussion forum that includes a question may be retrieved. One or more responses to the question from the discussion forum may be determined. An answer to the question may then be determined from the one or more responses to the question. In some embodiments, an answer may be determined based, at least in part, on at least one of a context of the text from the discussion forum, a context of a location in which the answer to the question may be further presented, and user behavior related to the one or more responses to the question.

26 Claims, 8 Drawing Sheets

(56) References Cited

U.S. PATENT DOCUMENTS

| | | |
|---|---|---|
| 2008/0154625 A1 | 6/2008 | Serbanescu |
| 2008/0189623 A1 | 8/2008 | Patil |
| 2008/0208975 A1 | 8/2008 | Olive |
| 2008/0274444 A1 | 11/2008 | Saliba |
| 2008/0287198 A1 | 11/2008 | Callery et al. |
| 2009/0292680 A1 | 11/2009 | Sabnani |
| 2009/0307196 A1 | 12/2009 | Shuster |
| 2010/0030753 A1 | 2/2010 | Nad et al. |
| 2010/0070503 A1 | 3/2010 | Abraham |
| 2010/0235341 A1 | 9/2010 | Bennett |
| 2011/0212430 A1 | 9/2011 | Smithmier et al. |
| 2011/0246910 A1 | 10/2011 | Moxley et al. |
| 2011/0302098 A1 | 12/2011 | Yoshida et al. |
| 2012/0116982 A1* | 5/2012 | Yoshida et al. ............... 705/304 |
| 2013/0007640 A1 | 1/2013 | Chao |
| 2013/0018909 A1 | 1/2013 | Dicker et al. |

OTHER PUBLICATIONS

Chen, Gaowei, et al., "Online discussion processes: Effects of earlier messages' evaluations, knowledge content, social cues and personal information on later messages"—Computers & Education vol. 50, Issue 3, Apr. 2008 (Received Apr. 2, 2006; received in revised form Jun. 28, 2006; accepted Jul. 18, 2006) ((pp. 678-692).

Van Eijl, Pierre J., et al., "Effects of Collaborative and Individual Learning in a Blended Learning Environment"—Education and Information Technologies 10:1/2, (pp. 49-63), 2005.

\* cited by examiner

IDENTIFYING AN ANSWER TO A QUESTION IN AN ELECTRONIC FORUM

BACKGROUND

Retailers and merchants involved in electronic commerce often do not offer live support or salespeople to help customers in purchasing decisions. Instead, a customer typically attempts to identify a product that meets the customer's needs based on information such as product descriptions, reviews, etc. Even a customer with considerable experience or knowledge regarding a category of products or services sometimes experiences difficulty in choosing a product from among tens or hundreds of similar products. For novice customers, meanwhile, the task of selecting from among a group of related products can be unproductive and even frustrating.

In response to these difficulties, retailers continually strive to make it easier for customers to research products and receive information that may assist in purchasing decisions. One way to improve a customer's experience includes providing discussion forums (or discussion boards) that allow customers to exchange information with other people via dialogue in a discussion. The ever-enlarging product catalog makes discussion forums helpful when a customer tries to distinguish between products, seek out impartial advice, learn more about a product or category, or obtain other information. A merchant with a large catalog of products may offer a large number of different discussion forums on a variety of topics, which may range from very specific topics to general ones. Some forums may be more active and have a greater frequency of responses than other forums. Thus, a customer may ask a question in a discussion forum that is not the most appropriate forum for receiving an answer, or that is not frequently viewed by users who may be able to provide an answer to the question. Accordingly, at any given time, one or more discussion forums may include an unanswered question from a customer.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to providing an answer to a question, such as a question asked by a user in an electronic discussion forum. In some embodiments, an answer module as disclosed herein may be used to identify an unanswered question in a first discussion forum, and determine a second discussion forum in which to present the question, where the second discussion forum is more likely than the first discussion forum to result in a user providing an answer to the question. The answer module may then present the question in the second discussion forum, receive one or more responses to the question in the second discussion forum, and determine whether one of the one or more responses comprises a good answer to the question. When the determination is that one of the one or more responses in the second discussion forum comprises a good answer, the answer module may present the good answer in the first discussion forum where the question was asked. In some embodiments, the answer module may additionally or alternatively present the good answer in one or more additional locations.

Aspects of the present disclosure also relate to identifying the best answer to a question. In some embodiments, the answer module may programmatically identify in an electronic discussion forum, one or more responses to a question. The answer module may then programmatically determine a best answer to the question, where the best answer to the question is one of the identified one or more responses to the question. In some embodiments, the best answer may be determined based at least in part by determining a first context of a discussion forum in which the question was asked, determining a second context of a location (for example, a forum and/or user interface) in which an answer to the question may be presented, evaluating user behavior of one or more users who have viewed at least one of the one or more responses to the question, and receiving one or more user votes, where each user vote corresponds to one of the one or more responses and indicates that the user has selected the corresponding response as the best answer to the question.

The forums disclosed herein may be forums associated with one or more elements or categories. Elements may generally include products, services, sellable units, user profiles, user-created content, abstract subjects, or anything else which may be organized in categories. Categories may be created and managed by an entity such as a retailer or merchant involved in electronic commerce, or any other entity which may organize elements according to one or more categorical hierarchies. The elements may be grouped or otherwise associated with one or more categories in a hierarchical organization. For example, an element may be an item available to be ordered by a customer, such as a portable DVD player. The portable DVD player may be associated with a category "DVD Players" that is itself associated with a larger category "Video." In addition, the portable DVD player may also be associated with a category "Portable Media Players" under a parallel category "Audio." It follows that elements and categories may be cross referenced to create a web of information in an electronic catalog.

Categorization may be used to enable a user to locate elements. Typically, categorization of elements follows a logical top-down organization that enables a user to quickly and intuitively locate a particular element by searching through a hierarchical catalog. For example, a user may desire to find a MP3 player in a catalog of elements. The user may begin at the top of hierarchical organization of elements and click from "electronics" to "audio," and then to "audio players," and finally to "MP3 players." Thus, in four steps, the user may be able to locate a category that contains MP3 players, which enable the user to browse possible elements that may satisfy the user's preferences. Each category may include a category page or other user interface listing information about the category, items included in the category, and/or other related information. As described herein, the term "category" may include any collection of elements, including without limitation, categories, sub-categories, classes, sub-classes, stores, departments, groups, communities, product types, etc.

A category may include or be associated with one or more category forums. In some embodiments, an electronic discussion forum (sometimes referred to herein as simply a "forum") is a discussion board hosted by a server where users, utilizing computing devices in network communication with the server, may exchange messages (such as text-based messages) via posts or entries, typically continued in a dialogue format on the discussion board. In some instances, the forum may facilitate exchanging and viewing images (e.g., videos, icons, or other graphical imagery) or exchanging and/or playing audio and/or video clips. Users may either contribute to the discussion or they may read other users' entries to gain insight on the discussion topic. The category forum may be presented with a category page to display the category forum with elements in the category and allow users to interact on the category forum. In some aspects, users may exchange files or other data via a forum, either using a message board or other response-posting environment.

The category forum may include one or more discussions. Each discussion may be created, in whole or in part, based on a topic related to an element and/or a particular category associated with the element. As a result, the discussions may be related to aspects of the category, including the elements associated with the category. Therefore, in some embodiments, the category forum may be a general forum for discussing a variety of elements, each sharing a common category.

In some embodiments, the category forums may be surfaced or presented on element pages, tag pages, search results pages, or other pages associated with an electronic catalog. In a collaborative environment, "tags" may be descriptors that may be freely chosen by different users to characterize or otherwise describe attributes of an item or other element, rather than having the description controlled by a centralized classification process. For example, tags can specify properties of an element that may not otherwise be obvious from the element itself and/or which may have special meaning to a user or a subset of users. In contrast to tags, categories typically create a hierarchical organization of a catalog of elements and are often created and/or managed by an entity such as, but not limited to, the operator of an electronic catalog. Thus, a tag page may include information about elements, categories, or other aggregated information that has been associated with a given user generated tag.

Forums may be created and managed in a variety of ways, such as by the systems and methods disclosed in related co-owned and co-pending U.S. patent application Ser. No. 11/963,755, entitled "Surfacing Forums Associated with a Category," filed Dec. 21, 2007, and U.S. patent application Ser. No. 11/963,773, entitled "Surfacing Forums Associated with a Search String," filed Dec. 21, 2007, both of which are incorporated herein by reference in their entirety.

For illustrative purposes, forums are often described below in the context of an item catalog offered by a retailer. However, it should be appreciated that the described systems and methods for providing an answer to a question may be implemented in other contexts. For example, instead of items in an electronic catalog, the elements could be social profiles, news articles, books, photos, abstract topics, etc.

Figure 1:
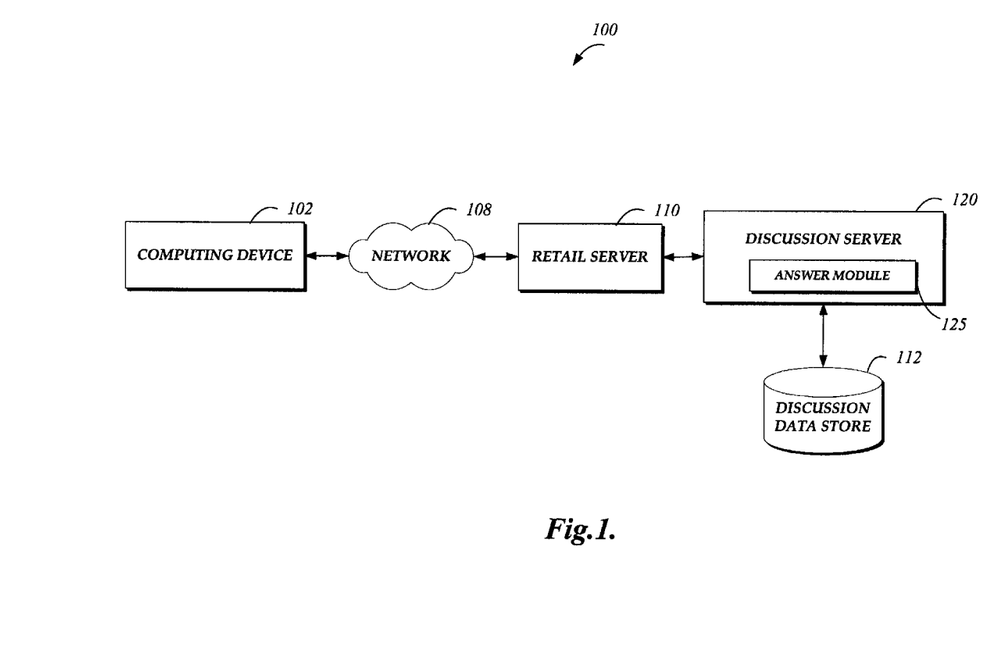
FIG. 1 is a block diagram depicting an illustrative operating environment including a retail server and a discussion server for identifying a question that has not been answered in an electronic forum and providing an answer to the question.

The illustrative operating environment shown in FIG. 1 includes a system 100 in which users may place orders for one or more items, as well as view and/or participate in discussions with other users. The system 100 may include a discussion server 120 that includes an answer module 125 for providing answers to questions left unanswered in a forum and determining the best answer to a question. The environment also includes a retail server 110 that facilitates electronic browsing and purchasing of goods and services using various user devices, such as computing device 102. Those skilled in the art will recognize that the computing device 102 may be any of a number of computing devices that are capable of communicating over a network including, but not limited to, a laptop, personal computer, personal digital assistant (PDA), hybrid PDA/mobile phone, mobile phone, electronic book reader, digital media player, and the like. The discussion server 120, which will be described below in more detail, may be connected to or in communication with a discussion data store 112 that stores discussion information, which may include text, images, video, or other content corresponding to various forums. Each forum may include multiple discussions, with each discussion including one or more user posts. As discussed above, a forum may be associated with an item, a category, a tag, a community, etc. In different embodiments, discussion data store 112 may be local to discussion server 120, may be local to retail server 110, maybe be remote from both discussion server 120 and retail server 110, and/or may be a network-based service itself. In the environment shown in FIG. 1, a user of the system 100 may utilize computing device 102 to communicate with the retail server 110 via a communication network 108, such as the Internet or other communications link. The network 108 may be any wired network, wireless network or combination thereof. In addition, the network 108 may be a personal area network, local area network, wide area network, cable network, satellite network, cellular telephone network, etc. or combination thereof. Protocols and components for communicating via the Internet or any of the other aforementioned types of communication networks are well known to those skilled in the art of computer communications and, thus, need not be described in more detail herein.

The system 100 is depicted in FIG. 1 as operating in a distributed computer environment comprising several computer systems that are interconnected using one or more computer networks. The system 100 could also operate within a computer system having a fewer or greater number of components than are illustrated in FIG. 1. Thus, the depiction of system 100 in FIG. 1 should be taken as illustrative and not limiting to the present disclosure. For example, the system 100 could implement various Web services components and peer-to-peer network configurations to implement at least a portion of the processes.

In brief, the retail server 110 is generally responsible for providing front-end communication with various user devices, such as computing device 102, via network 108. The front-end communication provided by the retail server 110 may include generating text and/or graphics, possibly organized as a user interface using hypertext transfer or other protocols in response to information inquiries received from the various user devices. The retail server 110 may obtain information on available goods and services (referred to herein as "items") from one or more data stores (not illustrated), as is done in conventional electronic commerce systems. In certain embodiments, the retail server 110 may also access item data from other data sources, either internal or external to system 100.

Figure 2:
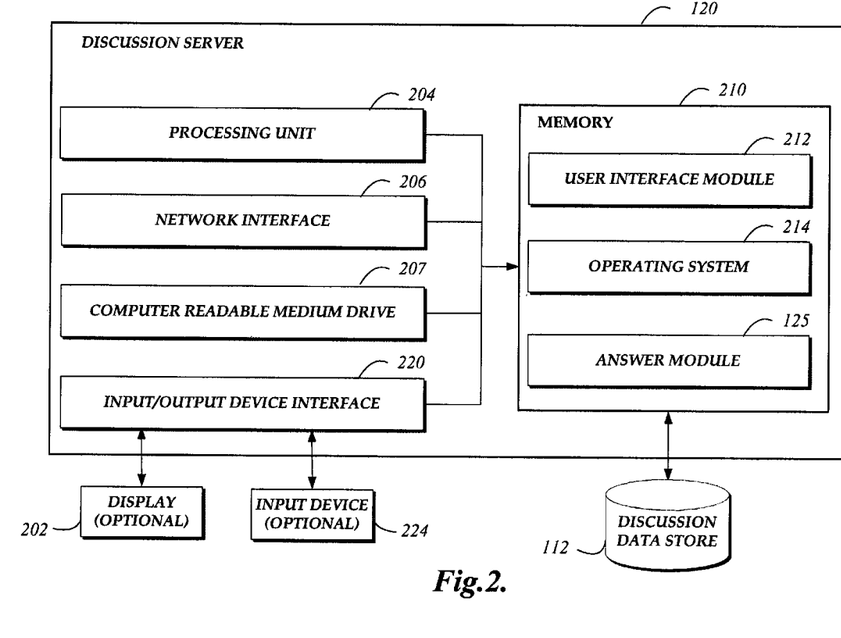
FIG. 2 depicts an example of a general architecture of a discussion server for providing discussion forums, including an answer module for identifying a question left unanswered in an electronic forum and providing an answer to the question.

FIG. 2 depicts an example of a general architecture of a discussion server 120 for providing electronic discussion forums and providing an answer to a question left unanswered in such a forum. The general architecture of the discussion server 120 depicted in FIG. 2 includes an arrangement of computer hardware and software components that may be used to implement aspects of the present disclosure. The discussion server 120 may include many more (or fewer) components than those shown in FIG. 2. It is not necessary, however, that all of these generally conventional components be shown in order to provide an enabling disclosure. As illustrated, the discussion server 120 includes a network interface 206, a processing unit 204, an input/output device interface 220, an optional display 202, an optional input device 224, and a computer readable medium drive 207, all of which may communicate with one another by way of a communication bus. The network interface 206 may provide connectivity to one or more networks or computing systems. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc.

The memory 210 contains computer program instructions that the processing unit 204 executes in order to implement one or more embodiments. The memory 210 generally includes RAM, ROM and/or other persistent or non-transitory memory. The memory 210 may store an operating system 214 that provides computer program instructions for use by the processing unit 204 in the general administration and operation of the discussion server 120. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation interface such as a web browser installed on the computing device. In addition, memory 210 may include or communicate with an auxiliary discussion data store 112. Data stored in the discussion data store 112 may include a variety of discussion information, as discussed above.

In addition to the user interface module 212, the memory 210 may include an answer module 125 that may be executed by the processing unit 204. In one embodiment, the answer module 125 implements various aspects of the present disclosure, e.g., identifying an unanswered question in a forum, surfacing the question in another forum, and determining a best answer to the question, as described further below. While the answer module 125 is shown in FIG. 2 as part of the discussion server 120, in other embodiments, all or a portion of an answer module may be a part of the retail server 110. For example, in certain embodiments of the present disclosure, the retail server 110 may include several components that operate similarly to the components illustrated as part of the discussion server 120, including a user interface module, answer module, processing unit, computer readable medium drive, etc. In such embodiments, the retail server 110 may communicate with a discussion data store, such as discussion data store 112, and the discussion server 120 may not be needed in certain embodiments. Further, although certain examples are illustrated herein in the context of a retail server 110, this is not a limitation on the systems and methods described herein. For example, various embodiments of the systems and methods for providing an answer to a previously unanswered question and identifying a best answer to a question can be used outside of the retail context.

Figure 3:
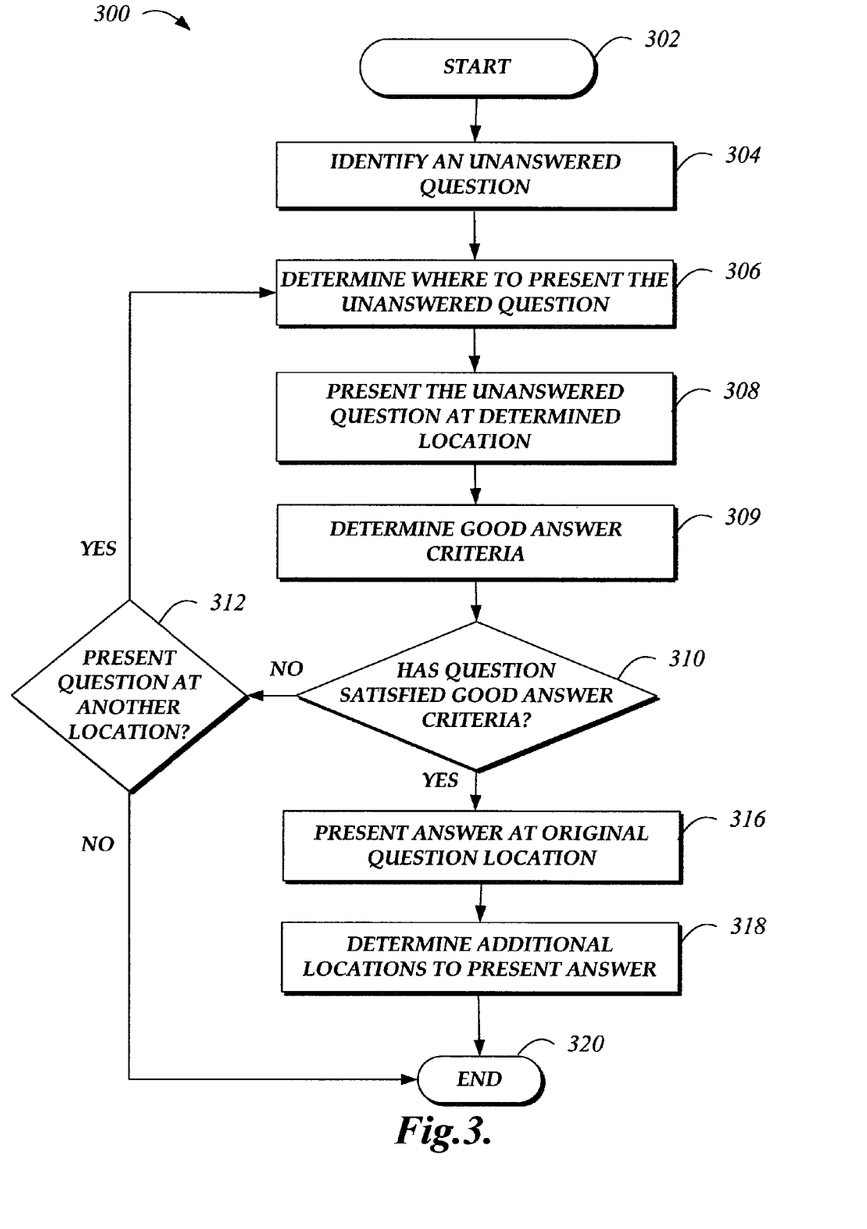
FIG. 3 is a flow diagram of an illustrative method implemented by the answer module to provide an answer to an unanswered question in a forum.

FIG. 3 is a flow diagram of an illustrative method 300 implemented by the answer module 125 to provide an answer to an unanswered question identified in a forum. The method begins at block 302, then proceeds to block 304, where the answer module identifies an unanswered question. In some embodiments, identifying an unanswered question may include indentifying a question, such as identifying a question in a post within a forum, then determining whether the question has been answered in the forum. The forum discussions may be retrieved from a data store, such as discussion data store 112. In some embodiments, the answer module may receive an indication of a particular forum in which the answer module should attempt to identify one or more unanswered questions. In other embodiments, the answer module may attempt to identify unanswered questions in all forums stored in the discussion data store, or a subset of the stored forums, on a regular basis (such as hourly, daily, weekly, etc.) or in response to predetermined triggering events. In some embodiments, a question may be indentified in a forum based on situational, semantic, and/or sentiment analysis. For example, if a discussion forum is organized into one or more discussions, where a discussion includes one or more posts from users, situational criteria may include whether the potential question is the first post in the discussion, which may indicate that a user is seeking information from other users. Situational criteria may also include, for example, the context in which the post was submitted, such as whether the post was submitted on an item detail page (e.g., a page that includes information associated with an item, such as price, description, a photo, etc.), which may be more likely to indicate that the user is seeking information than if the post was submitted in a general category discussion forum. Sentiment analysis may include a broad range of natural language processing, computational linguistics and/or text mining techniques that generally aim to determine the attitude of the posting user. For example, a "confusion" sentiment may indicate that a user is seeking guidance or advice. Semantic analysis may include, for example, whether a post or other potential question includes a question mark, includes words or sentence structures that may indicate an interrogative, and/or length of the post. In some embodiments, semantic analysis may be performed for posts written in languages other than English. For example, posts may first be translated to English, and/or posts may be analyzed for different symbols (such as symbols or words indicating an interrogative), words or sentence structures based on the language of the post. Non-semantic criteria, such as situational criteria, may be language independent.

In some embodiments, a question may be solicited from a user, such as by generating for display a user interface that includes a selectable option for submitting a question regarding an item or other element. For example, on an item detail page for a specific camera model, the page may include a selectable option to submit a question regarding the camera which will be posted in a forum associated with the camera model, the camera manufacturer, a product category associated with the camera type, etc. In this case, the answer module may determine that text entered by the user corresponds to a question without performing any analysis of the entered text. In some embodiments, the answer module may perform an initial analysis of text entered by a user to determine whether the text appears to include a question. If the answer module determines that the text appears to include a question, the answer module may prompt the user to verify that the user is asking a question or looking for help. Such a prompt may be presented, for example, while the user is typing the text, before the user submits the text, or after the user submits the text.

As mentioned above, in some embodiments, once a question has been identified, in order to identify one or more unanswered questions at block 304, the answer module 125 may determine whether the identified question has been answered in the forum where the question was originally asked. In determining whether the question has been answered, the answer module may determine whether any responses have been made in the discussion in which the question was asked. For example, if the question was asked as the first post in a discussion corresponding to a new topic, the answer module may determine whether there are any additional, responsive posts in the discussion. Similarly, if the question was asked in the middle of an existing discussion (e.g., the question was not the initial post that began the discussion), the answer module may determine whether any posts in the discussion that have been posted after the question refer back to the question or otherwise indicate that they are responsive to the question, either explicitly or implicitly. For example, in some embodiments, a user may be able to select a "reply" option that indicates to which specific post in a discussion the new post is intended to respond.

Additionally or alternatively, the answer module 125 may determine whether the post is responsive to the question in a similar manner as described below in reference to determining good answer criteria, discussed in reference to FIG. 4. For example, in determining whether the post is responsive to the question, the answer module 125 may determine whether the post provides an answer to the question based on context, user behavior, user votes, etc., as described below. In some embodiments, a question may only be considered unanswered if a certain amount of time has passed since the question was asked. The amount of time before a question is considered unanswered may depend on the context in which the question was asked, which may include determining the average frequency with which users post in a forum in which the question was asked.

Though not illustrated in FIG. 3, in some embodiments, the answer module 125 may additionally determine whether the question (or a similar question) has been answered previously. For example, in some embodiments a data store, such as discussion data store 112, may include frequently asked questions and their answers. In some embodiments, if a question is identical or similar to a frequently asked question, or another previously answered question stored in the discussion data store, the discussion server 120 may provide the previous answer to the user who asked the question, such as at the time the user types or submits the question, or may present the answer in the discussion where the question was asked. The discussion server 120 may determine whether a question is similar to a previously asked question in a variety of ways, including, but not limited to, pattern matching and/or the presence of keywords. In some embodiments, a question may not be considered duplicative of a previous question if a certain amount of time has passed since the previous question and answer were posted or otherwise provided. For example, many questions posts may have answers that change over time, such as the questions "What is the most recent book in this series?" or "When is this band's next tour?"

Once the answer module 125 has identified an unanswered question in a forum, the answer module proceeds to block 306, where the answer module determines where to present the question (e.g., which forum or other location). For example, the answer module may determine a location other than the location where the question was asked (such as a forum or page other than the forum where the question was posted) which may have a greater probability of a user answering the question. As used herein, a location may broadly refer to a forum or a user interface of any kind, such as a user interface or page associated with a category, community, search results, etc. In some embodiments, a forum may be considered a location itself, while in some embodiments, a forum as incorporated in a specific page or user interface (such as a page that includes display of a forum and other information associated with an item, category, community, search results, etc.) may be considered a location. In some embodiments, a page or user interface itself may be considered a location, such that an individual question, or a discussion that includes a question, may be presented or surfaced on a page (such as a search results page) without being associated with a specific forum. For example, a question that is asked in an infrequently viewed forum that is not particularly active (e.g., a forum that does not receive a high number of posts per day, week, month, etc.) may be less likely to receive answers than if the same question was asked in a more active forum. As another example, a question about a feature of a specific item may be more likely to receive an answer in a forum that is narrowly directed to that item (such as a forum that relates only to the item or to a specific, focused category associated with the item) rather than a forum associated with a broader category that includes hundreds of items. Accordingly, in some embodiments, the answer module may determine a location in which to present the unanswered question in part by determining the most narrowly focused forum associated with the question that has sufficient activity to indicate that an answer to the question would be likely in a certain time period.

Consider, as an example, an unanswered question that was originally posted in an item discussion forum for a novel about a high school student dating a vampire. In some embodiments, the answer module 125 may begin with the most narrowly focused forums associated with the novel in order to determine whether each considered forum is active enough that an answer to the question would be likely if the question were posted in the forum. The novel may be associated with forums for various tags, communities, categories, or other elements. For example, the novel may be associated with the following category forums, ordered from narrowest to broadest: "vampire romance," "paranormal romance," "vampire," "romance," . . . "young adult books," "books," etc. The novel may additionally be associated with other forums that are not included in a linear hierarchy of categories and sub-categories, such as a forum for the author of the book or a character in the book. Similarly, a category or community entitled "vampire romance" may be associated with both books and movies, and might not simply be a subcategory of a "books" category. While the more narrowly focused forums, such as "vampire romance," may be most likely to receive a focused answer if they had sufficient activity, these more narrowly focused forums may be less likely to be active. Conversely, a broad forum such as "books" may have a large amount of activity, but may not have frequently posting users with sufficient knowledge of the vampire romance genre to answer the question.

In order to determine whether a forum has sufficient activity to present the question and expect that an answer is likely to be provided, the answer module 125 may consider information regarding the activity of the forum. In some embodiments, information regarding the forum that is considered by the answer module may include, but not be limited to, one or more of the following: the number of users posting in the forum per period (which may be a day, week, month or other time period), the number of users viewing posts in the forum per period, the number of discussions started per period, the number of responses in each discussion, the average length of time it takes for a first post in a discussion to receive a certain number of responses, how long it has taken on average to receive a "good answer" to a question (discussed further below), the frequency with which good answers are received in a given time period, how many posts are by repeat contributors (or posting users) in a given time period, average length of posts, the average helpfulness of posts (such as by vote, discussed below), the quality of feedback regarding frequent contributors to the forum, etc. In some embodiments, one or more of the above considerations may be considered indicative of the "health" of a forum. In some embodiments, the various considerations may be weighted to arrive at a total score indicative of the health or activity of the forum. In some embodiments, the answer module may determine a score for each forum associated with the original forum where the question was asked, starting with the narrowest forum, until a forum is determined to surpass a certain threshold activity score, in which case that forum is selected as the forum in which to present the unanswered question. In some embodiments, the answer module may determine whether a similar question has been answered previously, and if so, the forum in which the similar question was previously answered may be selected as the forum in which to present the unanswered question.

At block 308, the answer module 125 presents (or "surfaces") the unanswered question at the forum or other location determined at block 306. In some embodiments, the unanswered question may be automatically presented at the determined forum or other location as a result of the determination at block 306. Presenting or surfacing the unanswered question in the determined forum may include adding to the determined forum the full discussion that included the question, adding only the actual post that included the question, or adding only the portion of the post that included the question (such as one sentence or one paragraph of a longer post). In some embodiments, presenting the question may not directly involve presenting the question for display to a user, but rather updating the discussion data store 112 to include the question in the determined forum, such that the next time the forum is displayed to a user, it will include the question. In some embodiments, the question may be presented in the determined location in a manner such that users are alerted that it is a question from a related forum, such as by a graphical or textual indicator. In other embodiments, the question may be included just as any other post to the forum would appear. In some embodiments, the question may be translated into a different language prior to presenting the question in the determined location. The question may be translated, for example, if the question is presented in a forum that is associated with a different language than the original forum in which the question was asked.

At block 309, which may occur after a certain amount of time has passed since the question was presented at the determined location, the answer module 125 determines good answer criteria. The good answer criteria may include various criteria that may be considered by the answer module to determine whether the question has received one or more good answers. A good answer may be, for example, an answer that addresses the question asked by the initial user, and/or an answer that is useful to the greatest number of customers. Determining good answer criteria is discussed in more detail below in reference to FIG. 4.

Once the answer module has determined good answer criteria (discussed below in reference to FIG. 4), the answer module 125 determines at decision block 310 whether the question has satisfied the good answer criteria. In some embodiments, this determination may include determining a best answer from among multiple answers based on which answer best satisfies the good answer criteria. In some embodiments, the answer module may determine whether a certain number of good answers have been received, rather than just a single good answer. In some embodiments, a good answer score may be determined based on one or more of the good answer criteria discussed below in reference to FIG. 4, such as by applying weights to the good answer criteria. In some embodiments, the good answer score may be compared to a good answer threshold to determine whether the answer or answers have satisfied that threshold. In addition, the good answer threshold may be set such that more than one answer may be considered a good answer, while in other embodiments, the good answer threshold may be set such that only the best answer is selected. In other embodiments, the answer module may determine that a question has satisfied the good answer criteria based on satisfying a single element or factor of the good answer criteria, or based on one or more conditional statements or rule sets based on one or more of the good answer criteria.

If the answer module 125 determines at decision block 310 that the question has not satisfied the good answer criteria after a certain amount of time, the method proceeds to decision block 312, where the answer module determines whether to present the question at another location, such as a different forum. In some embodiments, this determination may be made based at least in part on the number of responses the question has received, the helpfulness of the answers received, the average length of responses to the question, sentiment analysis of the responses, etc. For example, if it appears as though many users have viewed the question but not provided an answer, it may be determined that the determined location is not the most appropriate location to receive an answer, and that the question should be presented somewhere else. In some embodiments, if the question has resulted in many responses expressing annoyance or frustration with the question, the answer module may determine that the question should not be presented elsewhere in order to avoid frustrating additional users. If the answer module determines that the question should be presented at another location, the method returns to block 306 to determine a new location to present the question. If the answer module 125 determines at decision block 312 that the question should not be presented at another location, the method ends at block 320.

In some embodiments, after the answer module determines whether the question should be presented at another location, the answer module may determine whether the discussion server 120 should remove the question from the initially determined location where the question was surfaced at block 308 (not illustrated). The determination of whether to remove the question may be based on factors such as whether the forum or location is viewed by a large number of users, whether an answer would be expected in the amount of time that has passed since surfacing the question (which may be based on the forum's health, discussed above), whether sentiment analysis of responses to the question indicate annoyance or frustration, whether negative feedback has been received from users, and user votes regarding question and/or responses to the questions, among others. In some embodiments, the discussion server 120 may simply remove questions after a certain predetermined length of time. In other embodiments, the discussion server may not delete questions at all, or may simply remove older or less relevant questions from prominent display in the forum.

Returning to decision block 310, if the answer module 125 determines that the question has satisfied the good answer criteria, the method proceeds to block 316, where the answer module presents or surfaces the good answer (or good answers) at the original question location. In some embodiments, for example, if the question was originally asked in an item discussion forum, and was then surfaced and answered in a category discussion forum, the answer module may surface the answer in the item forum as a response to the post that included the question. In some embodiments, the answer module may additionally notify the customer or user that originally asked the question that an answer has been provided, as discussed below. For example, a notification that an answer to the customer's question has been provided may be provided to the customer by email, instant message, phone call, text message, and/or may be displayed to the customer on a user interface generated by the retail server 110. In some embodiments, the good answer may be translated into the original language in which the question was asked prior to presenting the good answer in the determined location. The good answer may be translated, for example, if the question was answered in a forum that is associated with a different language than the original forum in which the question was asked.

At block 318, in some embodiments, the answer module 125 optionally determines one or more additional locations to present or surface the good answer (or good answers). As mentioned above, a location may broadly refer to a page or user interface of any kind, such as a page associated with a category, forum, community, search results, etc. In some embodiments, the answer module may surface the good answers or best answer, along with the question, in forums for items, categories, tags, communities, etc., that are related to the item or category of the forum where the question was asked. For example, if a question was originally asked in forum for a certain book, the question and answer may be surfaced in a community forum related to the author of the book. The answer module may additionally surface the question and answer in search results pages for search terms associated with the item or category of the forum where the question was asked (such as search terms that include a tag associated with the item or category), which is discussed below in reference to FIG. 8. In some embodiments, the answer module may surface a question and answer at one or more additional locations based on how "good" the best answer is, which may be based on the criteria discussed below in reference to FIG. 4. The answer module may, in some embodiments, move the question and answer to the top of an item detail page. In some embodiments, as mentioned above, the answer module may add the question and answer to a data store that includes previously asked questions or frequently asked questions. Once the question and answer(s) are surfaced, the illustrated method ends at block 320.

Figure 4:
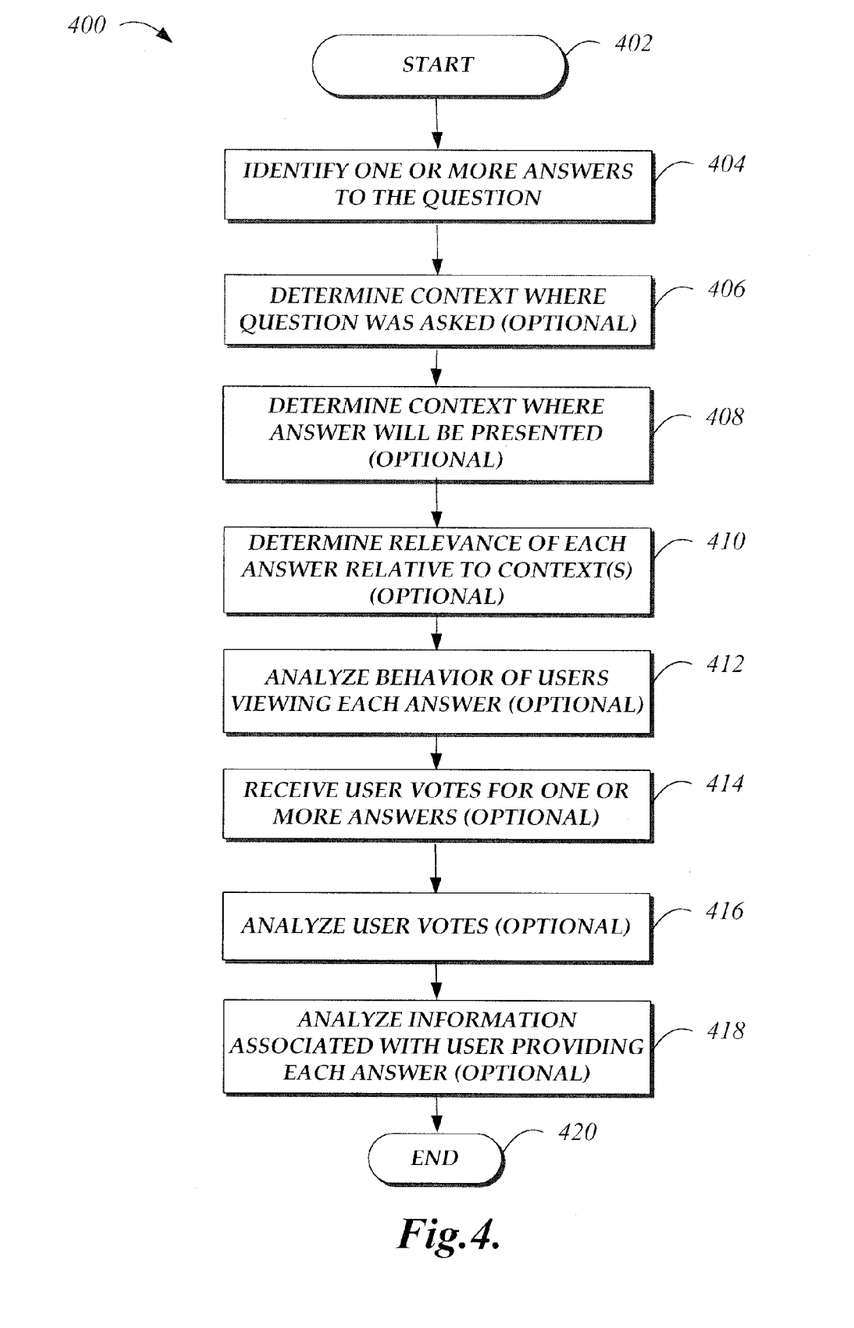
FIG. 4 is a flow diagram of an illustrative method implemented by the answer module to determine good answer criteria.

FIG. 4 is a flow diagram of an illustrative method 400 implemented by the answer module 125 to determine good answer criteria, such as at decision block 309 of FIG. 3. The method begins at block 402, then proceeds to block 404, where the answer module identifies one or more answers to the question. In some embodiments, an answer (or potential answer) to the question may be determined based on retrieving from discussion data store 112 any post responding to the post that includes the question, which may be in any forum in which the question has been surfaced (including the original location in which the question was asked, as well as a second location in which the answer module determined that the question should be surfaced). In some embodiments, all posts responsive to the post that includes the question may be considered potential answers. In other embodiments, a responsive post may be identified as an answer based on situational, semantic, and/or sentiment analysis, in a manner similar to that discussed above with respect to identifying a question. For example, a very short post, or a post with a frustration or annoyance sentiment, may indicate that the post does not include an answer to the question.

At block 406, the answer module 125 optionally determines the context where the question was asked, which may include the context in which a user originally asked the question, as well as the context where the question has been surfaced by the answer module. The context in which the question was asked may be based, in part, on the forum in which the question was originally asked by a user. For example, if the question was asked in an item forum displayed on an item detail page, the context may indicate a potential purchasing or buying context, and that the user is seeking information about a specific item. If instead the question was asked in a category forum for a broad category (such as "books") or a general community (such as "politics"), the context may be more of an information gathering or conversational context. In some embodiments, the context may also be determined based in part on the page browsing or viewing history of the user asking the question, or item purchase history of the user. For example, the determination may be based in part on whether the user asked the question in a forum that the user participates in frequently, whether the user asked the question in an item forum that the user viewed as a result of submitting a search term, whether the user has already purchased an item associated with the forum where the user asked the question, etc.

As mentioned above, the context where the question was asked may also include the context where the question has been surfaced by the answer module 125. For example, if the question has been surfaced in a community forum associated with fans or supporters of a certain item or category, the context may be considered less likely to receive an unbiased answer than if the question was asked in a broad category forum. On the other hand, if the question has been surfaced in a relatively narrow or focused forum, an answer may be more likely to be relevant and informative than one in a broad product category forum.

At block 408, the answer module 125 optionally determines the context where the answer will be presented. As discussed above in reference to FIG. 3, the answer may be presented in more than one location. One location in which the answer may be presented is the original location where the question was asked. The answer may additionally be surfaced in one or more other locations, which may include search results, item forums, category forums, community forums, etc. The determination of how "good" an answer is, or what the best answer is, may change based on the different locations where the answer will be surfaced. For example, in some embodiments, a different answer may be surfaced in a buying context than in an information gathering or conversational context. The context of a forum may be based, in part, on how experienced or knowledgeable the average posting user or contributor is relative to other forums. For example, a good answer for a novice user in a field may not be a good answer to an expert in the field, and vice versa.

At block 410, in embodiments in which the answer module 125 determined a context where the question was asked and/or a context where the question will be presented, the answer module 125 optionally determines the relevance of each potential answer to the context where the question was asked and/or where the question will be presented. For example, in some embodiments, the answer module may determine whether the context where the answer was posted or submitted is similar to the context where the answer will be presented or surfaced. For example, an answer regarding car wax that was originally posted in a forum related to a specific car manufacturer may be relevant to an item forum for a specific car of that manufacturer, but may be less relevant to a general category forum for "car wax" or a search results page for the search term "car wax." In some embodiments, in addition to the considerations mentioned above, relevance may be determined in part on the length of the answer, word choice, sentiment of posts responsive to the answer, various user feedback received in response to the answer (discussed further below), as well as other considerations.

At block 412, the answer module 125 optionally analyzes the behavior of one or more users that have viewed each answer. For example, the answer module may consider the browsing or page viewing history of each user that viewed each answer. In some embodiments, for example, the answer module may consider how frequently a user that was shown a portion of the answer selected to view the entire answer. The answer module may, in some embodiments, determine whether a user viewing the answer took further action based on the content of the answer. For example, if the answer included a reference to a specific item, such as by displaying a selectable option to view an item detail page for the item, the answer module may determine how often users viewing the answer actually selected to view the item detail page referenced in the answer. In some embodiments, the answer module may further determine whether one or more users that viewed such an item detail page actually ordered the item, added the item to an electronic shopping cart, added the item to a wish list, etc. In some embodiments, "user behavior" may broadly refer to various types of user feedback and user votes, discussed further below.

Figure 7:
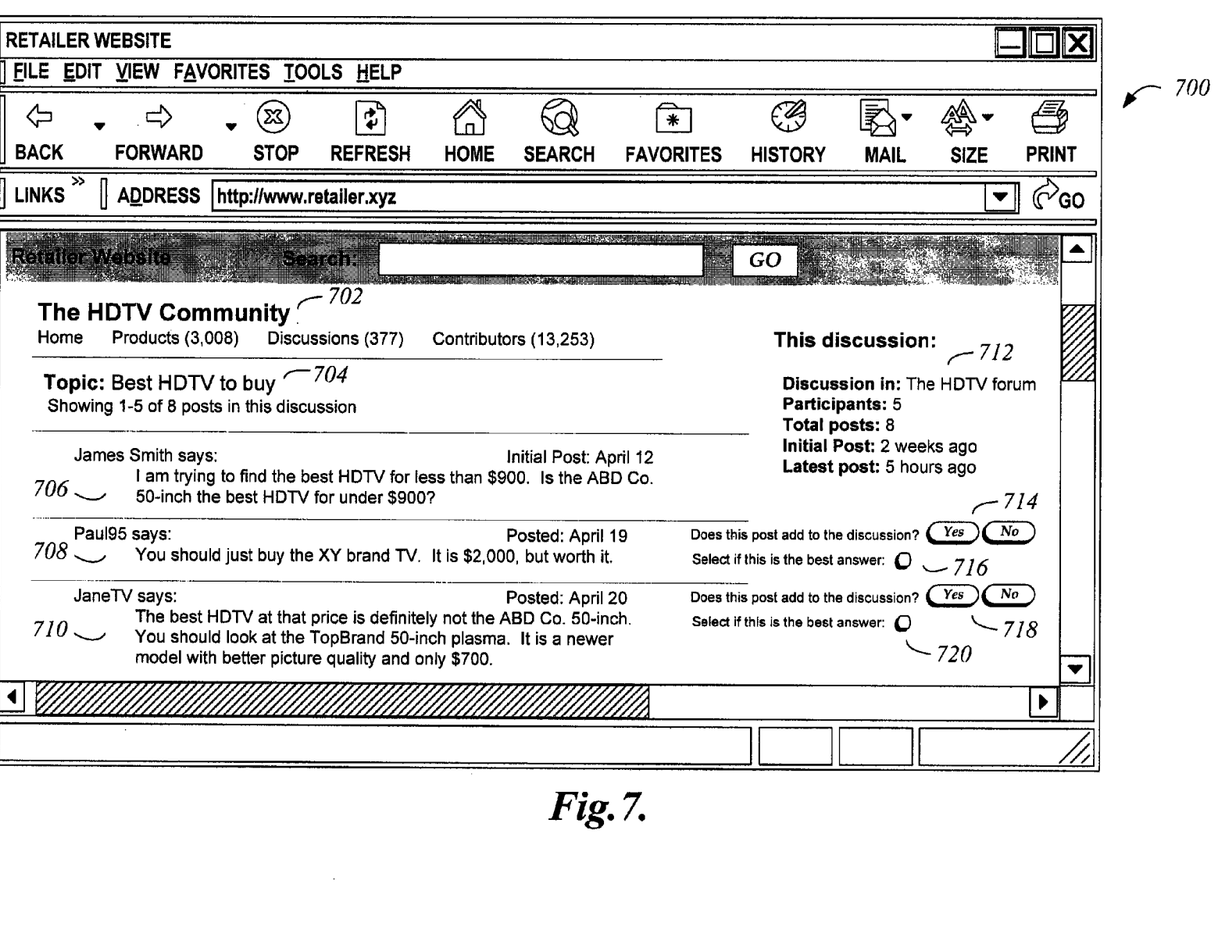
FIG. 7 is an illustrative user interface generated by the retail server and/or discussion server that displays a question that has been surfaced in a community forum.

At block 414, the answer module 125 optionally receives user votes for one or more answers, which may be received via a user interface such as that illustrated in FIG. 7. For example, in some embodiments, users may be presented with selectable options to indicate whether a given answer was helpful or added to the discussion. In some embodiments, users may be alternatively or additionally presented with a selectable option to indicate that a given answer is the best answer to a question (or best response to a post). An individual user may only have a single vote for the best answer to a question, but may be able to change his vote from one answer to another.

At block 416, in embodiments in which the answer module 125 received votes for one or more answers, the answer module 125 may analyze the user votes. In some embodiments, analyzing the user votes may include adding the votes to determine the answer or answers with the highest positive count, optionally with one or more weights applied based on the context and/or the user who submitted the vote. In some embodiments, votes received from certain users may be weighted higher than others. For example, a vote received from the user that originally asked the question may receive the highest weight. As further example, a vote received from an expert, a frequent contributor to a forum, and/or a user with a high level of positive feedback from other users may receive more weight than a vote from an unknown user. In some embodiments, the weights may depend on the context where the answer will be surfaced, such that a different vote count is determined when the answer will be surfaced in a search results page, for example, than in an item detail page. In some embodiments, if the vote was received in a context that is similar to the context where the answer will be surfaced, that vote may receive a higher weight than if the answer will be surfaced in a context that is not as closely related to the context where the vote was received. For example, users presented with the answers on a search results page may find that a different answer is best compared to users presented with the answers on an item detail page.

At block 418, the answer module 125 may analyze information associated with the users that have provided each answer. For example, the answer module may analyze profile information or feedback history associated with each user that has provided an answer. The information analyzed may include, for example, a reputation score associated with the user, whether the user has been designated as a good reviewer or a top reviewer, whether the user has been designated as an expert in a field or category, etc. The answer module may determine, in some embodiments, that an answer provided by a user who has received positive feedback from other users in the past is more likely to have provided a good answer in this instance. The illustrative method ends at block 420.

Figure 5:
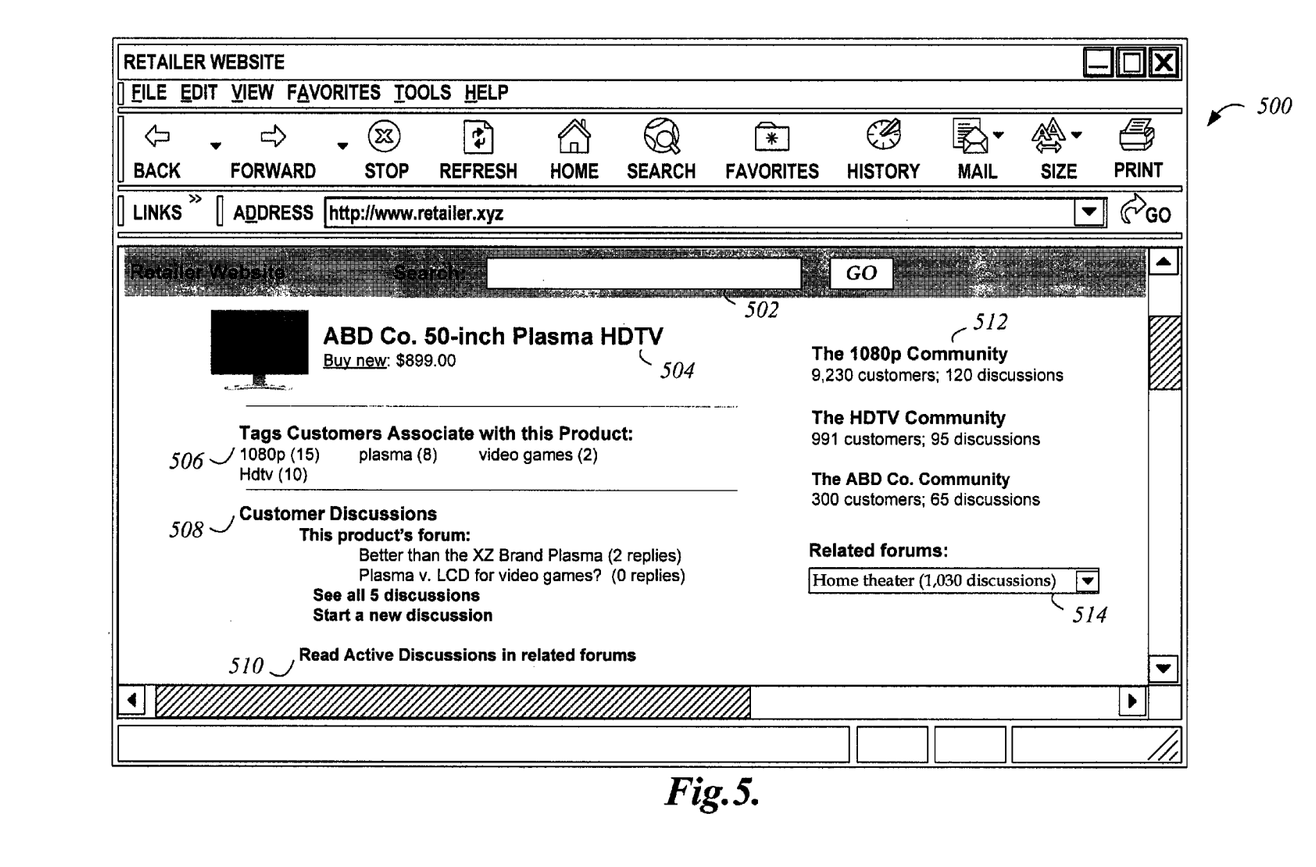
FIG. 5 is an illustrative user interface generated by the retail server that includes customer discussion information received from the discussion server.

FIG. 5 is an illustrative user interface 500 generated by the discussion server 120 and/or the retail server 110 that includes customer discussion information 508 received from or generated by the discussion server 120. As shown, the user interface 500 is displayed via a browser operating upon a computing device, such as computing device 102, utilized by a user. In the illustrated example, the user interface 500 may be considered an item detail page for item 504, "ABD Co. 50-inch Plasma HDTV." User interface 500 includes a search field 502 in which the user may enter search criteria, such as by typing text in the field. In response to the entry of search criteria, the retail server 110 may generate a user interface that displays one or more items that match the search criteria, such as the illustrative user interface shown in FIG. 8, discussed below. User interface 500 includes a display of tags 506 that customers have associated with item 504. The displayed tag information includes a count of the number of users that have tagged item 504 with the given tag. For example, eight users have tagged item 504 with the "plasma" tag. The illustrative user interface also includes display of related communities 512 (which may be selected by the user to request a different user interface which displays a community page, including a community forum). The user may select from menu 514 to view other forums related to item 504, which may include tag forums, category forums, community forums, or related item forums. As illustrated in customer discussion information 508, the forum associated with item 504 includes five discussions, two of which have topics displayed. The two displayed topics are listed as "Better than the XZ brand Plasma," which has two replies, and "Plasma v. LCD for video games?" which has no replies. The illustrative user interface also includes selectable text 510 for the user to request a user interface that displays active discussions in related forums.

Figure 6:
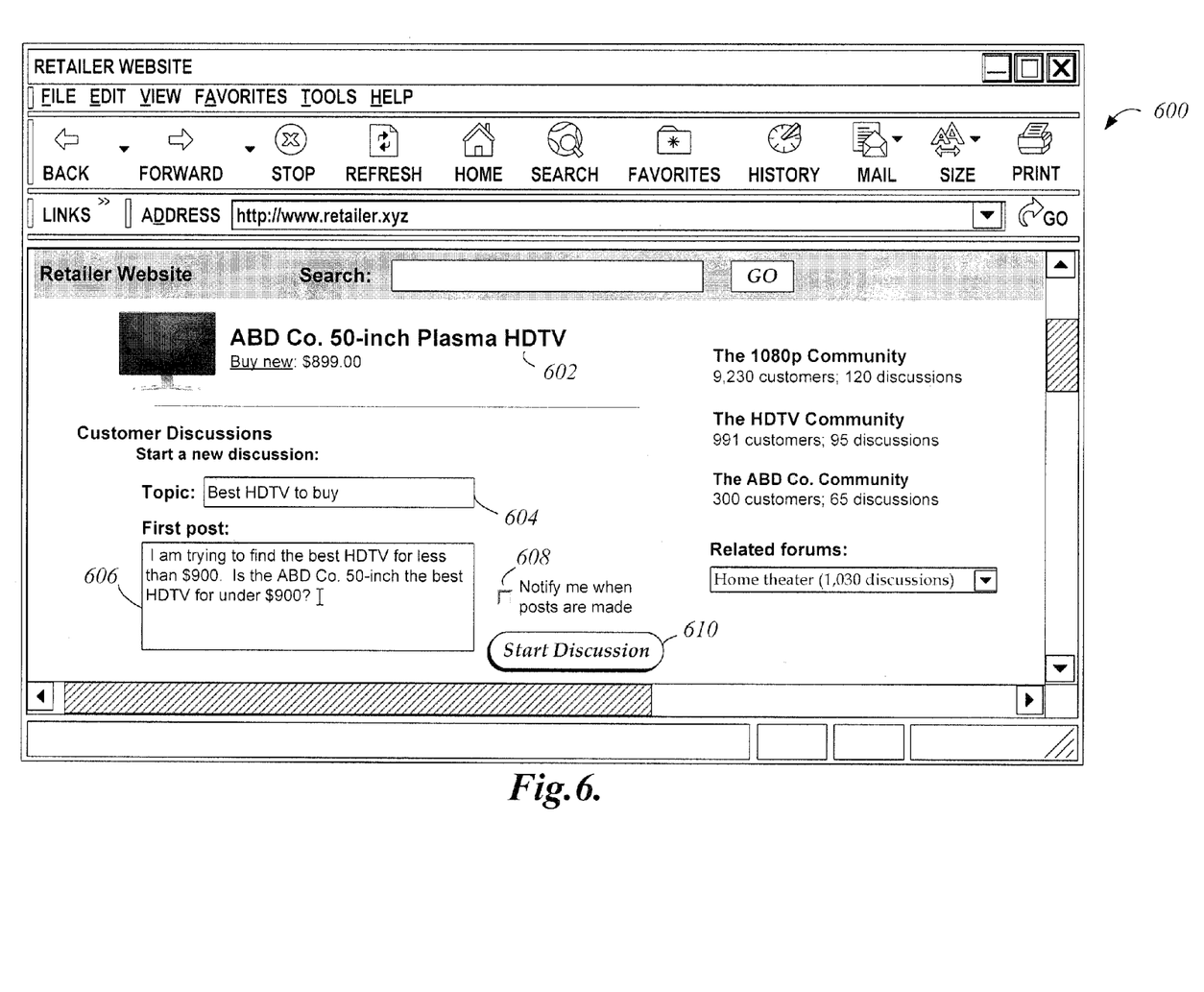
FIG. 6 is an illustrative user interface generated by the retail server and/or discussion server that enables a user to start a new discussion regarding an item in a forum associated with the item.

FIG. 6 is an illustrative user interface 600 generated by the retail server 110 and/or discussion server 120 that enables a user to start a new discussion regarding an item 602 in a forum associated with the item 602. The illustrative user interface 600 may be generated in part by the retail server 110 and in part by the discussion server 120, or may generated in whole by either retail server 110 or discussion server 120, depending on the embodiment. User interface 600 may be generated, for example, in response to the user selecting the selectable text "Start a new discussion" displayed in user interface 500 shown in FIG. 5. As shown in user interface 600, the user has typed a topic 604 for the new discussion, which reads "Best HDTV to buy." The user has also entered post text 606, which includes a question regarding item 602. The user interface 600 includes a selectable option 608 which may be selected to indicate that the retail server 110 should contact the user if a post is made in the discussion responding to the user's initial post. In some embodiments, this notification may be made by email, instant message, phone call, text message, and/or may be displayed on a user interface generated by retail server 110. The user interface 600 includes selectable text 610 which may be selected to create the new discussion. Selecting text 610 may store a new discussion in discussion data store 112 in the item forum for item 602. The new discussion may include the topic 604 and first post text 606 entered by the user.

FIG. 7 is an illustrative user interface 700 generated by the retail server 110 and/or discussion server 120 that displays a question 706 that has been surfaced in a community forum for community 702, "The HDTV Community." Illustrative user interface 700 may be generated, for example, after the answer module 125 has determined that the question asked by the user in FIG. 6 has not received an answer in the forum where it was originally posted (the item forum for the "ABD Co. 50-inch Plasma HDTV"). Prior to generating user interface 700, the answer module may have additionally determined that the question should be surfaced in the community forum for "The HDTV Community," such as by the methods discussed above in reference to FIG. 3. As illustrated, the topic 704 corresponds to the topic 604 entered by the user in FIG. 6. Similarly, first post text 706 corresponds to the first post text 606 entered by the user in FIG. 6. User interface 700 includes two responses to the question, response 708 and response 710. Each response includes selectable text 714 or 718 that enables the user to vote on whether the corresponding post or response added to the discussion (e.g., whether the post was helpful). Each response additionally includes a selectable option 716 or 720 that enables the user to indicate whether the corresponding post or response is the "best answer." In some embodiments, a given user may only be able to select a single selectable option 716 or 720 in a given discussion, such that if a user has already selected option 716 and then selects option 720, the user has effectively switched his "best answer" vote from response 708 to response 710. User interface 700 also includes discussion information 712, which includes information which may relate to the health of the forum, such as the number of participants and when the latest post occurred.

Figure 8:
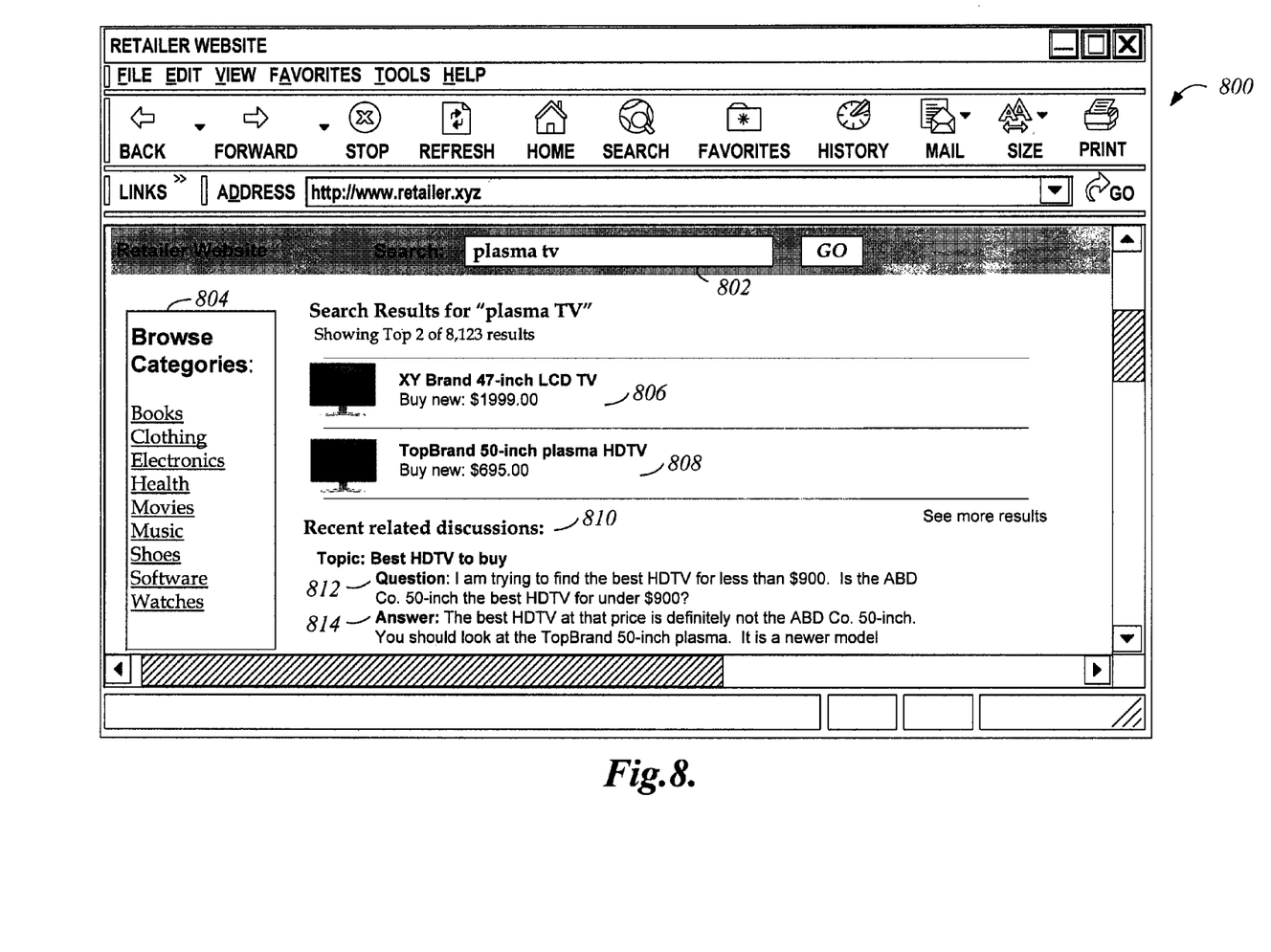
FIG. 8 is an illustrative user interface generated by the retail server that displays search results and discussion information received from the discussion server.

FIG. 8 is an illustrative user interface 800 generated by the retail server 110 that displays search results and discussion information received from or generated by the discussion server 120. User interface 800 may be considered an example of a question and answer being surfaced in search results. As illustrated, user interface 800 includes selectable browse options 804, which include a listing of various item categories, each of which may include its own category forum. The user interface 800 may be presented, for example, after a user has entered a search string or search term "plasma tv," as illustrated in search field 802. As illustrated, user interface 800 includes display of two of 8,123 search results, items 806 and 808. User interface 800 also includes recent related discussions 810. The recent related discussions 810 include display of question 812 and answer 814 (which correspond to question 706 and answer 710 in FIG. 7). User interface 800 may have been generated after the answer module 125 had determined that response 710 displayed in user interface 700 (a post in response to the question surfaced on "The HDTV Community" forum) was the best answer, or a good answer, to question 706 in user interface 700 of FIG. 7. The discussion server 120 may have determined that in addition to surfacing the best answer back in the original forum where the question was asked (such as the item forum for "ABD Co. 50-inch Plasma HDTV," displayed in FIG. 5), the answer should be surfaced in search results for certain terms associated with the item (in this case, the "ABD Co. 50-inch Plasma HDTV" item). The discussion server 120 may have determined that the search term "plasma tv" is associated with the "ABD Co. 50-inch Plasma HDTV" item, for example, because portions of the search term appear in the item description, the item has been tagged with a "plasma tv" tag, the item belongs to a category of items that includes plasma televisions, the item is associated with a plasma and/or television community, the "plasma tv" search term is related to or included in other metadata associated with the item, etc. In some embodiments, the discussion server may have determined that question 812 and answer 814 should be surfaced in search results for search term "plasma tv" in part because the question and/or answer themselves include all or a portion of the search term. The discussion server 120 may have additionally determined that the question 812 and answer 814 were asked in a context that indicates that they may be relevant or helpful for a user searching for the term "plasma tv," for example, because the question and answer may help in a purchasing decision for a plasma television. While the answer is illustrated as surfaced on a search results page, the answer may have additionally been surfaced on one or more related category forums, item forums, etc., as discussed above.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for identifying a good answer to a question left unanswered in a discussion forum, the system comprising:
    a data store that stores text from a first discussion forum that includes at least one question; and
    a computing device in communication with the data store and that is operative to:
        identify, in the text from the first discussion forum, a question that has not received a good answer in the first discussion forum;
        identify one or more responses to the question from at least one discussion forum other than the first discussion forum;
        determine good answer criteria for each of the one or more responses to the question identified from the at least one discussion forum other than the first discussion forum, wherein the good answer criteria for each of the one or more responses is based at least in part on a relevance of a context in which the question was included in the first discussion forum to a context in which the identified one or more responses were included in the at least one discussion forum other than the first discussion forum; and
        determine a good answer to the question from the one or more responses to the question identified from the at least one discussion forum other than the first discussion forum, wherein the good answer is determined based at least in part on whether the good answer criteria is satisfied for the good answer.

2. The system of claim 1, further comprising applying weights to the good answer criteria.

3. The system of claim 1, wherein good answer criteria for each of the one or more responses further includes a user vote for the one of the one or more responses, wherein the user vote comprises a vote that a given user considers the one of the one or more responses to be the best answer to the question.

4. The system of claim 1, wherein good answer criteria further includes a vote indicating that a user that originally asked the question considers one of the one or more responses to be the best answer to the question.

5. A computer-implemented method for identifying a good answer to a question left unanswered in a discussion forum, the computer-implemented method comprising:
    as implemented by one or more computing devices configured with specific executable instructions,
        retrieving text from a first discussion forum;
        identifying, in the text of the first discussion forum, a question that has not received a good answer in the first discussion forum;
        identifying one or more responses to the question from at least one discussion forum other than the first discussion forum; and
        determining a good answer to the question from the one or more responses to the question identified from the at least one discussion forum other than the first discussion forum, wherein the good answer is determined based, at least in part, on a relevance of a context in which the question was included in the first discussion forum to a context of the at least one discussion forum in which the one or more responses were identified, and user behavior related to the one or more responses to the question.

6. The computer-implemented method of claim 5, wherein the good answer is further determined based at least in part on user votes for the one of the one or more responses.

7. The computer-implemented method of claim 6, wherein a user vote for the one of the one or more responses comprises a vote that the one of the one or more responses was helpful to a given user.

8. The computer-implemented method of claim 6, wherein a user vote for the one of the one or more responses comprises a vote that a given user considers the one of the one or more responses to be the best answer to the question.

9. The computer-implemented method of claim 6, further comprising applying weights to the user votes for the one of the one or more responses based, at least in part, on a context in which the user votes were received.

10. The computer-implemented method of claim 5, wherein the good answer is further determined based at least in part on at least one of: situational analysis of the one or more responses, semantic analysis of the one or more responses, and sentiment analysis of the one or more responses.

11. The computer-implemented method of claim 5, wherein user behavior related to one of the one or more responses to the question comprises whether a user selected to view the one of the one or more responses.

12. The computer-implemented method of claim 5, wherein user behavior related to one of the one or more responses to the question comprises whether a user selected an item referenced in the one of the one or more responses.

13. The computer-implemented method of claim 5, wherein user behavior related to one of the one or more responses to the question comprises whether a user purchased an item referenced in the one of the one or more responses.

14. The computer-implemented method of claim 5, wherein the good answer is further determined based at least in part on a selection of the good answer by a user that asked the question.

15. The computer-implemented method of claim 5, wherein the good answer is further determined based at least in part on a location in which the good answer to the question may be further presented, wherein the location in which the good answer to the question may be further presented comprises a discussion forum other than the first discussion forum and the at least one discussion forum in which the one or more responses were identified.

16. The computer-implemented method of claim 5, wherein the first discussion forum and the at least one discussion forum comprising the one or more responses are each associated with at least one of an item, a category, a sub-category, a community, and a tag.

17. The computer-implemented method of claim 5, further comprising determining whether a context of the at least one discussion forum comprising the one or more responses is similar to a context of a location in which the good answer to the question may be further presented.

18. A non-transitory computer-readable medium having computer-executable instructions stored thereon for identifying a good answer to a question in a discussion forum, the computer-executable instructions comprising:

retrieving text from a first discussion forum;

identifying, in the text of the first discussion forum, a question that has not received a good answer in the first discussion forum;

identifying one or more responses to the question from at least one discussion forum other than the first discussion forum; and determining a good answer to the question from the one or more responses to the question, wherein the good answer is determined based, at least in part, on a comparison between a context of the text from the first discussion forum and a context of the at least one discussion forum other than the first discussion forum.

19. The non-transitory computer-readable medium of claim 18, wherein the good answer is further determined based at least in part on user votes for one of the one or more responses.

20. The non-transitory computer-readable medium of claim 18, wherein the context of the at least one discussion forum other than the first discussion forum is determined based at least in part on one or more user interfaces generated prior to the question being included in the discussion forum.

21. The non-transitory computer-readable medium of claim 18, wherein the good answer is further determined based at least in part on a location in which the good answer to the question may be further presented, wherein the location in which the good answer to the question may be further presented comprises a user interface that displays information associated with an item.

22. The non-transitory computer-readable medium of claim 18, wherein the good answer is further determined based at least in part on a location in which the good answer to the question may be further presented, wherein the location in which the good answer to the question may be further presented comprises a user interface that displays search results.

23. The non-transitory computer-readable medium of claim 18, wherein the good answer is further determined based at least in part on a location in which the good answer to the question may be further presented, wherein the location in which the good answer to the question may be further presented comprises a discussion forum other than the discussion forum that includes the question.

24. A system for identifying an answer to a question left unanswered in a discussion forum, the system comprising:

a data store that stores text from a first discussion forum that includes a question; and a computing device in communication with the data store and that is operative to:

identify one or more responses to the question from at least one discussion forum other than the first discussion forum; and determine an answer to the question from the one or more responses to the question from the at least one discussion forum other than the first discussion forum, wherein the answer is determined based, at least in part, on a relevancy of a context of the text from the first discussion forum to a context of text from the at least one discussion forum other than the first discussion forum.

25. The system of claim 24, wherein the answer is further determined based at least in part on user votes for one of the one or more responses.

26. The system of claim 24, wherein the answer is further determined based at least in part on at least one of: situational analysis of the one or more responses, semantic analysis of the one or more responses, and sentiment analysis of the one or more responses.

* * * * *